United States Patent
Suh et al.

(10) Patent No.: US 9,912,445 B2
(45) Date of Patent: Mar. 6, 2018

(54) SYSTEM AND METHOD FOR ERROR FEEDBACK USING A REPEATED PREAMBLE FIELD

(71) Applicant: Huawei Technologies Co., Ltd., Shenzhen (CN)

(72) Inventors: Jung Hoon Suh, Kanata (CA); Peter Loc, Cupertino, CA (US); Osama Aboul-Magd, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 24 days.

(21) Appl. No.: 15/065,688

(22) Filed: Mar. 9, 2016

(65) Prior Publication Data
US 2017/0070315 A1 Mar. 9, 2017

Related U.S. Application Data

(60) Provisional application No. 62/216,078, filed on Sep. 9, 2015.

(51) Int. Cl.
| | | |
|---|---|---|
| *H04L 1/00* | (2006.01) | |
| *G06F 11/10* | (2006.01) | |
| *H04L 1/08* | (2006.01) | |
| *H04L 1/12* | (2006.01) | |
| *H04L 1/16* | (2006.01) | |

(52) U.S. Cl.
CPC ........ *H04L 1/0061* (2013.01); *G06F 11/1004* (2013.01); *H04L 1/0045* (2013.01); *H04L 1/0072* (2013.01); *H04L 1/08* (2013.01); *H04L 1/12* (2013.01); *H04L 1/1614* (2013.01)

(58) Field of Classification Search
CPC ....... H04L 1/12; H04L 1/0061; H04L 1/0072; H04L 27/2649; H04L 1/0045; H04L 1/1614
See application file for complete search history.

(56) References Cited

U.S. PATENT DOCUMENTS

| | | |
|---|---|---|
| 2007/0079215 A1 | 4/2007 | Kim et al. |
| 2015/0009894 A1 | 1/2015 | Vermani et al. |
| 2015/0163028 A1 | 6/2015 | Tandra et al. |

(Continued)

FOREIGN PATENT DOCUMENTS

| | | |
|---|---|---|
| CN | 1321028 A | 11/2001 |
| WO | 2015003119 A1 | 1/2015 |
| WO | 2015161068 A1 | 10/2015 |

OTHER PUBLICATIONS

Wu et al., Novel carrier frequency offset mitigation in IEEE802.11a/g/n. systems, 2009, IEEE, pp. 1 to 4.*

(Continued)

*Primary Examiner* — Shelly A Chase
(74) *Attorney, Agent, or Firm* — Slater Matsil, LLP

(57) ABSTRACT

An embodiment method for error feedback includes receiving, by a wireless device, a first preamble field and a repeated preamble field of a first frame. The method also includes decoding, in a frequency domain, the first preamble field and the repeated preamble field to obtain a first set of bits and a second set of bits. The method also includes performing a bitwise comparison of the first set of bits and the second set of bits to determine at least one bit error position.

29 Claims, 12 Drawing Sheets

(56) References Cited

U.S. PATENT DOCUMENTS

2016/0261451 A1* 9/2016 Li .................. H04L 27/2649

OTHER PUBLICATIONS

Ergen, M. et al., "QoS Aware Adaptive Resource Avocation Techniques for Fair Scheduling in OFDMA Based Broadband Wireless Access Systems", IEEE Transactions on Broadcasting, vol. 49, No. 4, pp. 362-370, Dec. 2003.

IEEE Standard for Information Technology—Telecommunications and Information Exchange Between Systems—Local and Metropolitan Area Networks-Specific Requirements Part 11: Wireless LAN Medium Access Control (MAC) and PhysicalPhysical Layer (PHY) Specifications, IEEE Std. 802.11 2007, Jun. 12, 2007, pp. 1-1,232.

Lew, Mirin, "802.11ac Wireless LAN: What's New and the impact on Design and Test", EE Times. Retrieved Feb. 3, 2016, from http://www.eetimes.com/document.asp?doc_id=1279218.

* cited by examiner

SYSTEM AND METHOD FOR ERROR FEEDBACK USING A REPEATED PREAMBLE FIELD

This application claims the benefit of U.S. Provisional Application No. 62/216,078, filed on Sep. 9, 2015, which application is hereby incorporated herein by reference.

TECHNICAL FIELD

The present invention relates generally to a system and method for error feedback, and, in particular embodiments, to a system and method for error feedback using a repeated preamble field.

BACKGROUND

In a typical IEEE 802.11 Wireless Local Area Network (WLAN), a transmitted packet includes a preamble portion and a data portion. If any of the information either in the preamble portion or in the data portion fails to be decoded by a receiving device, the whole packet is discarded.

SUMMARY

In accordance with a first example embodiment of the present invention, a method is provided for error feedback that includes receiving, by a wireless device, a first preamble field and a repeated preamble field of a first frame. The method also includes decoding, in a frequency domain, the first preamble field and the repeated preamble field to obtain a first set of bits and a second set of bits. The method also includes performing a bitwise comparison of the first set of bits and the second set of bits to determine at least one bit error position.

In accordance with a second example embodiment of the present invention, a method is provided for error feedback. The method includes receiving, by a wireless device, a first frame that includes a first preamble field, a second preamble field, and a data field. The method also includes combining the first preamble field and the second preamble field to obtain a combined signal and decoding the combined signal to obtain a decoded combined signal. The method also includes determining that the decoded combined signal includes a bit error. The method also includes, in response to determining that the decoded combined signal includes a bit error, decoding the first preamble field and the second preamble field to obtain first information bits that include non-application data and second information bits that include non-application data. The method also includes performing two cyclic redundancy checks, which include a first cyclic redundancy check of the first information bits and a second cyclic redundancy check of the second information bits. The method also includes decoding the data field to obtain payload bits that include application data.

In accordance with a third example embodiment of the present invention, a wireless device is provided. The wireless device includes a processor, and a non-transitory computer readable storage medium coupled to the processor and storing programming for execution by the processor. The programming including instructions for receiving a first frame from an AP. The first frame includes a first information field, a second information field, and a data field. The programming also includes instructions for combining the first information field and the second information field to obtain a combined signal, and decoding the combined signal to obtain a decoded combined signal. The programming also includes instructions for determining whether the decoded combined signal includes an error. The programming also includes instructions, in response to determining that the decoded combined signal includes an error, for decoding the first information field and the second information field to obtain first information bits that include non-application data and second information bits that include non-application data. The programming also includes instructions for performing two cyclic redundancy checks that include a first cyclic redundancy check of the first information bits and a second cyclic redundancy check of the second information bits. The programming also includes instructions for decoding the data field to obtain payload bits that include application data.

In accordance with a fourth example embodiment of the present invention, a system for telecommunications is provided. The system includes an AP, which includes a processor, and a non-transitory computer readable storage medium coupled to the processor and storing AP programming for execution by the processor. The AP programming includes instructions for determining a transmit data field in accordance with a first transmission scheme and with transmit payload bits that include application data and a first check value. The AP programming also includes instructions for generating first transmit information bits that include non-application data and a second check value. The AP programming also includes instructions for determining a transmit preamble field and a duplicate transmit preamble field in accordance with a second transmission scheme and with the first transmit information bits. The AP programming also includes instructions for transmitting a transmit frame, which includes the transmit preamble field, the duplicate transmit preamble field, and the transmit data field. The AP programming also includes instructions for receiving a feedback message from a wireless device that received the transmit frame as a received frame. The feedback message indicates at least one bit error position determined during a bitwise comparison between first decoded information bits of the received frame and second decoded information bits of the received frame. The first decoded information bits correspond to the transmit preamble field, and the second decoded information bits correspond to the duplicated transmit preamble field.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
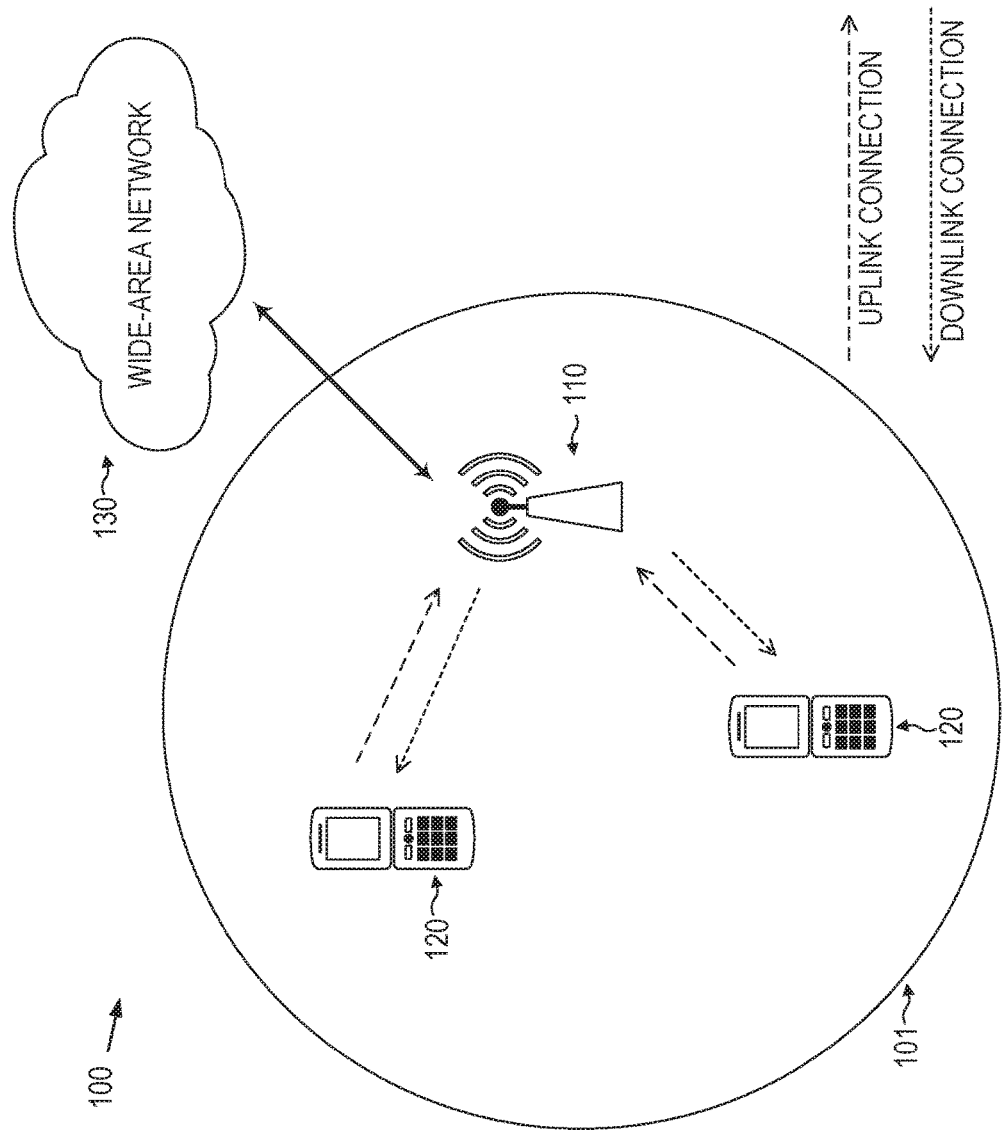
FIG. 1 is a block diagram illustrating an example wireless communications network, in accordance with embodiments of the present invention.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In various embodiments, a comparison of a received preamble field with a received redundant version of the preamble field is used to detect one or more error positions (e.g., positions of received bit(s) in error) and provide feedback to a transmission point that transmitted these fields. The feedback may be performed using, for example, a dedicated field of an ACK message. The transmitter may take action in response to this feedback such as, e.g., boosting the transmit power for the tones affected by the detected error position(s).

In various embodiments, the received preamble field is a Legacy SIGNAL (LSIG) field having a format similar to a SIGNAL preamble field of legacy IEEE Standard 802.11a. In such embodiments, the received redundant version of the preamble field may be a Repeated Legacy Signal (RLSIG) field that is a duplicate of the LSIG field received in the same preamble of an Orthogonal Frequency Division Multiplexing (OFDM) frame, and the error position(s) fed back to the transmission point are bit error position(s) that correspond to frequency ranges (e.g., subcarrier tones) of the OFDM frame. The comparison of the LSIG and the RLSIG fields may be, for example, a bit-by-bit comparison. The redundantly transmitted information in the LSIG field and its duplicate RLSIG field may also be used for, e.g., auto-detecting the frame by performing cross correlation at a receiving device prior to applying a Fourier transform to the frame.

While embodiments are described herein primarily with respect to LSIG and RLSIG fields in the preamble of an OFDM frame, various embodiments may be applied to any non-payload communications data structure that carries a duplicated field for pattern recognition, auto detection, etc. Embodiments may be implemented in WLAN networks and devices, such as Access Points (APs) and mobile devices (e.g., User Equipments (UEs)).

Furthermore, in various embodiments a preamble field is redundantly transmitted by an AP as a first pair of repeated fields and is received by a mobile device without errors. A second preamble field of the same packet frame is received with errors. The mobile device feeds back to the AP an indication of the error condition of this second preamble field. The AP may take action in response to this feedback such as, e.g., retransmitting the entire frame using a repeated format for the second preamble field.

In various embodiments, the first pair of repeated preamble fields and the second preamble field are received by the mobile device without errors, but a third preamble field of the same frame is received with errors. The mobile device feeds back to the AP an indication of the error condition of this third preamble field. The AP may take action in response to this feedback such as, for example, retransmitting the entire frame using a different transmission scheme (e.g., mapping to a smaller phase constellation) with increased robustness and a lower data rate.

In various embodiments, the entire preamble is received by the mobile device without errors, but payload data portion of the same frame is received with errors. The mobile device feeds back an indication of this condition to the AP. The AP may take action in response to this feedback such as, for example, retransmitting the entire frame using a different transmission scheme with increased robustness and a lower data rate, or retransmitting the payload data portion of the frame using this more robust transmission scheme.

In various embodiments in which Orthogonal Frequency Division Multiple Access (OFDMA) is used, the AP also is capable of using the error feedback from the receivers to determine the most error-free tone groups for its next transmission to a particular receiver. The AP may also use the feedback from one or more receivers to allocate resources for a particular receiver in a frequency range where the least number of errors have been detected.

FIG. 1 illustrates a network 100 for communicating data. The network 100 comprises a base station 110 having a coverage area 101, a plurality of mobile devices 120, and a Wide-Area Network (WAN) 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the WAN 130. As used herein, the term "base station" refers to any component (or collection of components) configured to provide wireless access to a network, such as an enhanced base station (eNB), a macro-cell, a femtocell, a Wi-Fi AP, or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac/ax, etc. As used herein, the term "mobile device" refers to any wireless component or device (or collection of components or devices) capable of establishing a wireless connection with a base station, such as a UE, a mobile station (STA), and other wirelessly enabled devices. In some embodiments, the network 100 may comprise various other wireless devices, such as relays, low power nodes, etc.

Figure 2A:
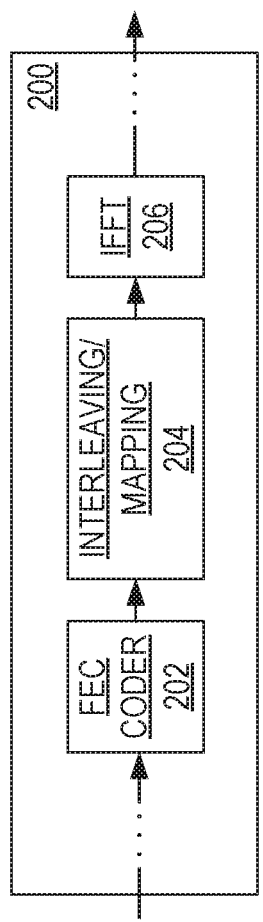
FIG. 2A is a block diagram illustrating a transmit signal processing stage that may be used for processing data prior to its transmission over the wireless communications network of FIG. 1, in accordance with embodiments of the present invention.

FIG. 2A is a block diagram illustrating an embodiment transmit processing stage 200 that may be used for processing both application data (i.e., payload data) and non-application data (i.e., overhead data) prior to transmitting it over the network 100 of FIG. 1. The transmit processing stage 200 includes a Forward Error Correction (FEC) coder 202 followed by an interleaving/mapping stage 204 followed by an Inverse Fast Fourier Transform (IFFT) stage 206. The FEC coder 202 adds robustness to the outbound frame by applying FEC coding to fields of the frame. The interleaving/mapping stage 204 interleaves bits within these fields and phase maps these bits to a phase constellation. The IFFT stage 206 applies an inverse Fourier transform to the fields of the frame such the time-sequential bits of the signal prior to the IFFT stage 206 correspond to frequency subchannels of a transmitted signal. In this disclosure, transmit signal processing operations that occur prior to the IFFT stage 206 are referred to as occurring in the frequency domain, while transmit signal processing operations that occur after the IFFT stage 206 are referred to as occurring in the time domain.

The transmit processing stage 200 may be configured to select among various Modulation and Coding Schemes (MCSs) for transmitting an outbound frame. An MCS is a transmission scheme that includes a particular combination of techniques such as, for example, FEC, phase constellation mapping, interleaving, subcarrier separation, etc., as part of a design trade-off in which data rate and/or processing simplicity is balanced against communications robustness (e.g., SNR, Bit Error Rate (BER), and the like). In an embodiment, an MCS may be chosen that uses dual-coded modulation. Table 1 lists some other exemplary MCS combinations for one or more portions of, e.g., an IEEE Standard 802.11a frame:

TABLE 1

Exemplary MCS Combinations

| Phase Constellation Mapping | FEC Coding Rate | Channel Spacing (MHz) | Subcarrier Separation (MHz) | Data Rate (Megabits/s) | Data Bits Per Subcarrier |
|---|---|---|---|---|---|
| BPSK | ½ | 20 | 20/64 (=0.3125) | 6 | 0.5 |
| BPSK | ½ | 10 | 10/64 | 3 | 0.25 |
| BPSK | ½ | 5 | 6/64 | 1.5 | 0.125 |
| BPSK | ¾ | 20 | 20/64 | 9 | 0.75 |
| QPSK | ½ | 20 | 20/64 | 12 | 1 |
| 16-QAM | ½ | 20 | 20/64 | 24 | 2 |
| 64-QAM | ⅔ | 20 | 20/64 | 48 | 4 |

Embodiments may use a wide variety of additional MCS combinations other than those shown in Table 1. Also, although Table 1 shows MCS combinations having channel spacings of 5, 10, and 20 MHz, other channel spacings (e.g., 40 MHz, 80 MHz, 160 MHz, etc.) may be used. In some embodiments, multiple channels, each containing multiple subcarriers, may be combined for increasing communications robustness or data rate. In some embodiments, different MCSs may be selected that have different numbers of data bits per subcarrier, the reciprocal of which is referred to in this disclosure as the bit expansion of the MCS.

Figure 2B:
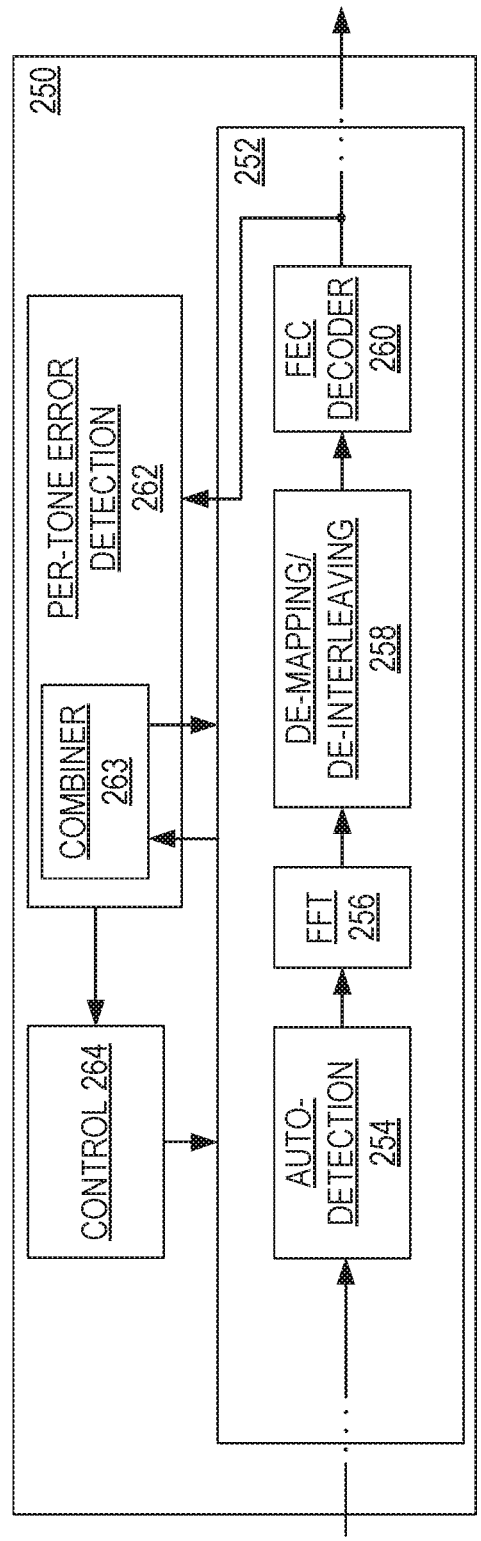
FIG. 2B is a block diagram illustrating a receive signal processing stage that may be used for processing data after it is physically received, in accordance with embodiments of the present invention.

FIG. 2B is a block diagram illustrating an embodiment receive processing stage 250 that may be used for processing both application data and non-application data after physically receiving the data at a receiving device in the network 100 of FIG. 1. The receive processing stage 250 includes a receive path 252 that includes an auto-detection stage 254 followed by a Fast Fourier Transform (FFT) stage 256 followed by a de-mapping/de-interleaving stage 258 followed by an FEC decoder 260. The auto-detection stage 254 correlates redundant information contained in the inbound frame so that the receiving device may know which type of frame is being used. As an example, the auto-detection stage 254 may distinguish between different frame formats specified by different WLAN amendments (e.g., Wi-Fi 802.11a/b/g/n/ac/ax, and the like).

The FFT stage 256 applies a Fourier transform to the fields of the frame such the frequency subchannels of the inbound signal correspond to time-sequential bits of the signal that is output from the FFT stage 256. In this disclosure, receive signal processing operations that occur prior to the FFT stage 256 are referred to as occurring in the time domain, while receive signal processing operations that occur after the FFT stage 256 are referred to as occurring in the frequency domain.

Referring again to FIG. 2B, the de-mapping/de-interleaving stage 258 extracts the bits of the frame's fields that were phase mapped to one or more phase constellations and de-interleaves the bits within these fields. The FEC decoder 260 decodes the FEC coding that was applied to these bits prior to the inbound frame's transmission.

The receive processing stage 250 of FIG. 2B also includes a per-tone error detection stage 262 and a control stage 264. The per-tone error detection stage 262 includes a combiner 263. The combiner 263 receives a pair of duplicate non-payload fields of an inbound frame from the receive path 252 and generates a combined signal by combining the pair of duplicate non-payload fields. The duplicate non-payload fields may be combined by using, e.g., Log Likelihood Ratio (LLR) techniques, averaging, etc. The combiner 263 provides this combined signal back to the receive path 252 so that it may be further processed. The per-tone error detection stage 262 receives a processed version of the combined signal from the output of the FEC decoder 260 and performs a parity check or other Cyclic Redundancy Check (CRC) or check value on this combined signal to determine whether any bit errors are present in either of the duplicate non-payload fields. The per-tone error detection stage 262 also receives each of the pair of duplicate non-payload fields at the output of the FEC decoder after they have been individually decoded in the frequency domain. The per-tone error detection stage 262 individually examines the decoded information (i.e., non-payload) bits of each of these duplicated fields to determine whether any bit errors are present, how many bit errors are present, and/or the positions of the bit errors within the duplicate fields. The per-tone error detection stage 262 also provides feedback to the control stage 264, which controls the operation of the stages within the receive path 252. In an embodiment, the control stage 264 may cause the receive path 252 to discard an inbound frame or to stop processing an inbound frame based on feedback from the per-tone error detection stage 262.

Figure 3A:
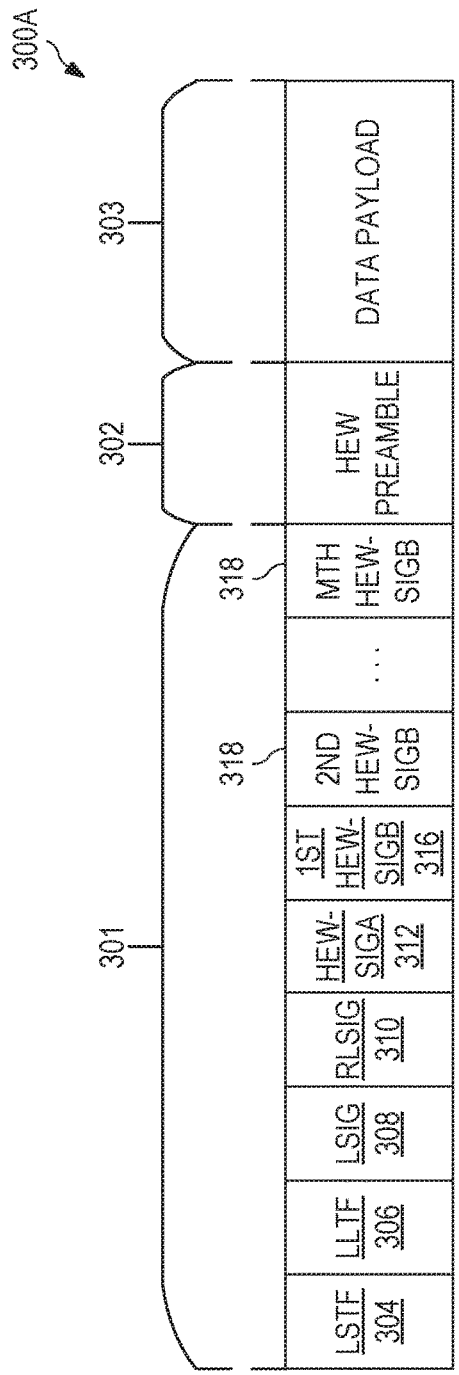
FIG. 3A is a block diagram illustrating an example frame that includes a preamble portion and a payload data portion, in accordance with embodiments of the present invention.

FIG. 3A is a block diagram illustrating an example frame 300A for communicating data over the network 100 of FIG. 1. The frame 300A includes a preamble portion 301, a High Efficiency WLAN (HEW) preamble portion 302, and a payload data portion 303. In some embodiments, a packet is made up of one instance of frame 300A, while in other embodiments a single packet may contain many frames. The preamble portion 301A of frame 300A includes a Legacy Short Training Field (LSTF) 304, a Legacy Long Training Field (LLTF) 306, an LSIG field 308, an RLSIG field 310, a High Efficiency WLAN Signal A (HEW-SIGA) field 312, a first High Efficiency WLAN Signal B (HEW-SIGB) field 316, and a second HEW-SIGB field 318. The frame 300A may also include additional second HEW-SIGB fields 318 so that a variable integer M of HEW-SIGB fields 316 and 318 are included in the preamble 301A of frame 300A.

Referring again to FIG. 3A, a variable amount of payload data is contained in one or more data fields that are included in the payload data portion 303 of the frame 300A. The payload data in the payload data portion 303 may be generated in the application layer of the 7-layer OSI model by an application (e.g., a website, a text messaging application, a remote sensing device, and the like). The preamble 301 contains information bits made up of non-application data that is appended to the payload data portion 303 in lower layers prior to transmission of the frame 300A. The preamble 301 uses overhead bandwidth to convey information about, for example, the type of payload data, the data rate, the communication channel, etc. In an embodiment, each of the fields of the preamble portion 301 contains coded bits. In an embodiment, the redundantly transmitted information in the LSIG field and its duplicate RLSIG field are used by a receiving device (e.g., mobile device 120 of FIG. 1) for auto-detecting an inbound instance of frame 300A by performing cross correlation in the time domain. In an embodiment, a bitwise comparison of the LSIG field 308 and the RLSIG field 310 may be performed when an error is detected in one of these fields.

Figure 3B:
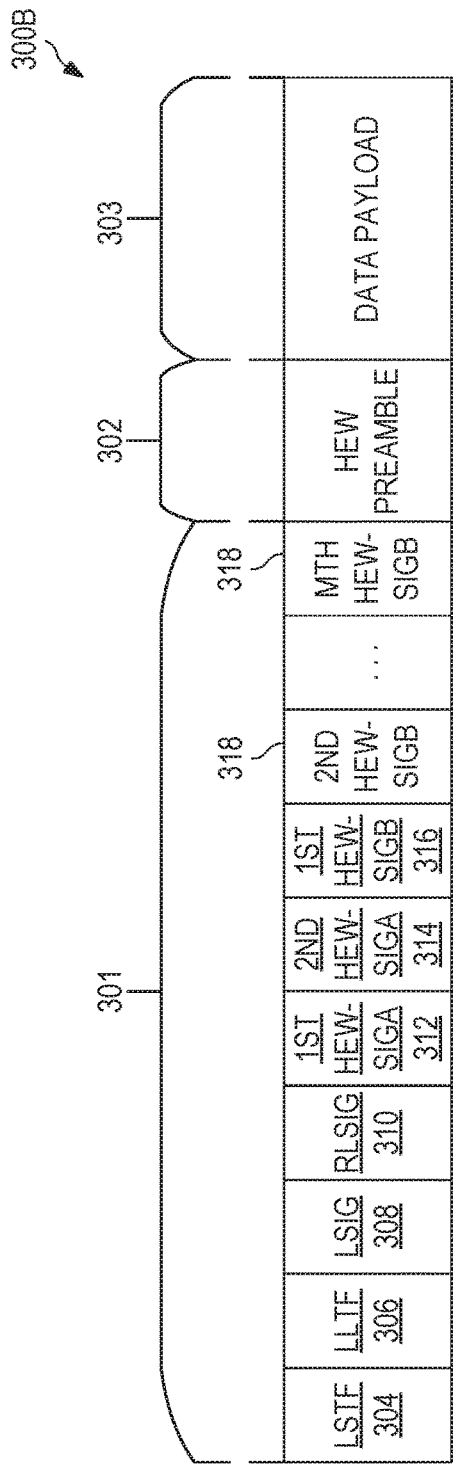
FIG. 3B is a block diagram illustrating a second example frame, in accordance with embodiments of the present invention.

FIG. 3B is a block diagram illustrating an alternative example frame 300B for communicating data over the network 100 of FIG. 1. The difference between frame 300A and frame 300B is that, in frame 300B, a second HEW-SIGA field 314 is included in addition to the first HEW-SIGA field 312. In some embodiments, the second HEW-SIGA field 314 may help provide more robust communication of the HEW-SIGA information over a noisy communications channel.

Figure 4:
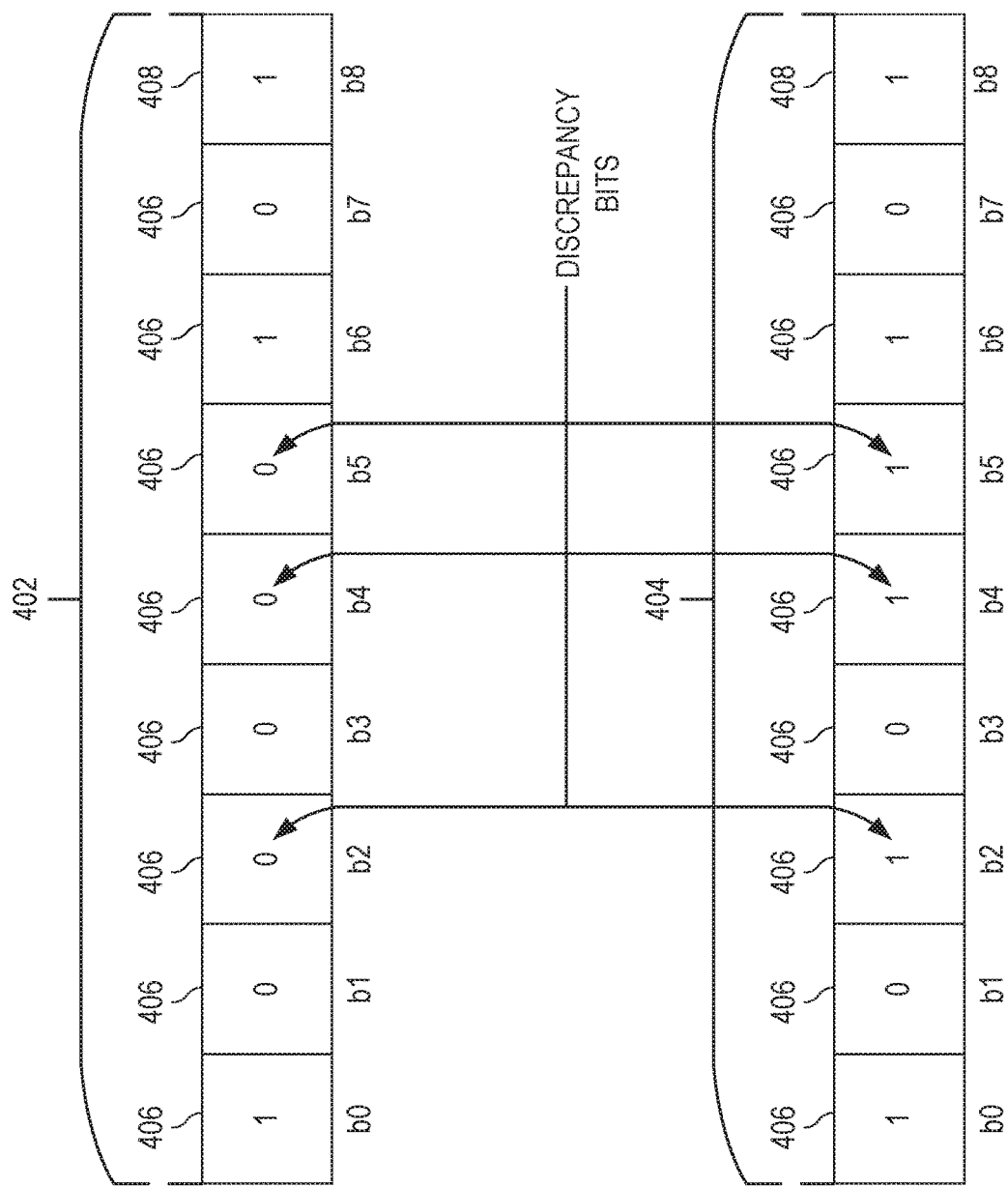
FIG. 4 is a block diagram illustrating a bitwise comparison of a received field with a received redundant version of the field, in accordance with embodiments of the present invention.

FIG. 4 is a block diagram illustrating an embodiment bitwise comparison of a received field 402 with a received redundant field 404 that is a received redundant version of the field 402. The respective bits 406 and 408 of each of received fields 402 and 404 are numbered with bit positions 0-8. Both fields 402 and 404 respectively include ordinary bits 406 a parity bit 408. The parity bits 408 are located at position 8 and are used for performing a parity check, which is a 1-bit case of a CRC. In the embodiment of FIG. 4, each parity bit 408 is an XOR sum of the remaining bits 406 of each respective field, and the parity bit 408 indicates an odd parity by a parity value of 1 and an even parity by a parity value of 0. In other embodiments, a parity bit may be used that is an XOR sum of bits and an additional 1-valued bit. In still other embodiments, a CRC that contains more than 1 bit may be used.

In the embodiment of FIG. 4, each of fields 402 and 404 only contain eight ordinary bits 406, but the same technique of bitwise comparison may be applied to duplicate fields of varying length. In an embodiment, a bitwise comparison may be performed on duplicate fields that each contain 64 bits.

Referring again to FIG. 4, the parity bits 408 of fields 402 and 404 both have an error-free received value of 1, which only matches the odd number of 1-valued bits 410 for received redundant field 404. The received field 402, however, has an even number of 1-valued bits 412, which does not match the 1-valued parity bit 408 of field 402. Thus, the received field 402 has been received with an error. Comparing each bit of the received field 402 and the received redundant field 404 shows that discrepancies are present at bit positions b2, b4, and b5, which indicates that there are bit errors at these positions in the received field 402. The positions of these bit errors contain information that is potentially useful for the device that transmitted the frame containing the fields 402 and 404.

A bitwise comparison as in FIG. 4 may be performed on duplicate fields to which a Fourier transform has been applied by a receiving mobile device 120, as in, e.g., an OFDM communications scheme. In this case, the bit error positions correspond to subcarrier tones of the communications channel that had a lower Signal-to-Noise Ratio (SNR) during transmission of the frame, which may be caused by, e.g., frequency-selective fading or other channel fluctuation. In an embodiment, the mobile device 120 may provide the bit error positions in a feedback message to a base station 110 (shown in FIG. 1) that transmitted the frame containing received fields 402 and 404. In an embodiment, the base station 110 may then modify a transmission characteristic such as, for example, boost the transmission power over the affected frequency ranges. In other embodiments, a base station 110 may modify other transmission characteristics such as, e.g., a data rate and/or robustness over the affected frequency ranges. In an embodiment, the base station 110 may modify a resource allocation in accordance with the affected frequency ranges.

In an embodiment, an LSIG field 308 and an RLSIG field 310 (shown in FIG. 3A and FIG. 3B) are modulated using an M-ary phase constellation mapping in an OFDM communications system, such that given a static communications channel, a single fading tone in the communications channel would correspond to M bit error positions in a bitwise comparison of the demapped LSIG field 308 and RLSIG field 310. In an embodiment, a preamble 301 (shown in FIG. 3A and FIG. 3B) is transformed prior to transmission using an L-point IFFT stage, while a payload data portion 303 of the same frame is transformed using a K×L-point IFFT stage, where K and L are positive integers. In such an embodiment, a single bit error position in the LSIG/RLSIG comparison, or of the preamble portion 301 in general, corresponds to K subcarrier error positions in each payload data field of the payload data portion 303 for a static communications channel. For example, when the LSIG field 308 and RLSIG field 310 of a transmit frame are modulated using binary phase shift keying (BPSK) and a 64-point IFFT and the payload data portion 303 of the same frame is modulated using a 256-point IFFT, then the bit expansion for each of the LSIG field 308 and RLSIG field is 2, and the bit expansion of the payload data is 8. Thus, in this example a single fading tone in a static communications channel corresponds to two bit error positions in the bitwise comparison and to eight bit errors in each payload data field of the payload data portion 303.

In an embodiment, feedback of bit error positions discovered during a bitwise comparison of redundant fields is provided to the base station 110 as part of a block acknowledgment (ACK) frame. In other alternative embodiments, the per-tone bit error feedback may be provided as part of a different type of message to the base station 110 or as a separate feedback message. As a first alternative embodiment, a feedback field (e.g., an 8-byte field) is included in the media access control (MAC) header of a UL frame for carrying the feedback in the UL direction, which is useful when and ACK is delayed and in cases where a cascaded frame structure (i.e., DL frame followed directly by a UL frame) is used. In a second alternative embodiment, a management or control frame is defined that is dedicated for communicating the feedback from the mobile device 120 to the base station 110 such that the transmission of feedback is independent of the ACK frames.

Figure 5:
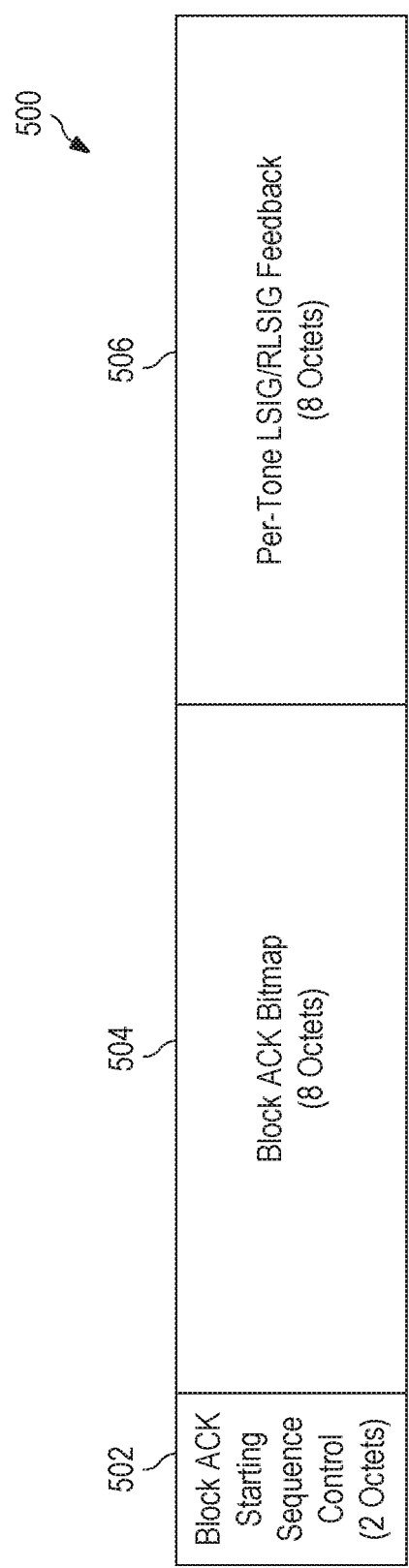
FIG. 5 is a block diagram illustrating an example block acknowledgement (ACK) frame, in accordance with embodiments of the present invention.

FIG. 5 is a block diagram illustrating an embodiment block ACK frame 500 for an OFDM communications system that is capable of providing per-tone LSIG/RLSIG feedback. A mobile device 120 provides the bit error positions in a per-tone LSIG/RLSIG feedback portion 506 of the block ACK frame. The block ACK frame 500 also includes a block ACK starting sequence control field 502 and a block ACK bitmap field 504. In the embodiment of FIG. 5, the block ACK starting sequence control field 502 is 2 octets long, followed by the block ACK bitmap field 504 that is 8 octets long, followed by the per-tone LSIG/RLSIG feedback field 506 that is 8 octets long. In other embodiments, a varying order and length of fields may be used in the block ACK frame 500, and the number of fields may be increased and decreased depending on the particular communications protocol.

Referring again to FIG. 5, the length of the per-tone LSIG/RLSIG feedback field 506 is set at 8 octets, which is 64 bits. In an embodiment, each of the LSIG and RLSIG also include 64 bits corresponding to 64 different frequency tones for an OFDM system. Each bit of the field 506 indicates the decoding status of one of these LSIG/RLSIG bit positions or tones. In an embodiment, bit n of the field 506 is set to "1" if there is a discrepancy in the decoding of the $n^{th}$ tone between LSIG and RLSIG. Otherwise bit n is set to "0." In other embodiments, the opposite coding may be used in the per-tone LSIG/RLSIG feedback field 506.

In an embodiment, under certain failure conditions during receive processing of an inbound frame (e.g., frame 300A of FIG. 3A), a receiving device sends the Block ACK 500 with all the bits of the Block ACK Bitmap 504 set to zero, and with a failure condition (e.g., HEW SIG-A CRC failure or HEW SIG-B CRC failure) indicated in the Per Tone L-SIG/RL-SIG Feedback field 506. In an embodiment, when an inbound frame is discarded during receive processing (e.g., due to failure of the frame check sequence (FCS)), then the receiving device does not send a Block ACK 500 to the device that transmitted the frame.

Figure 6:
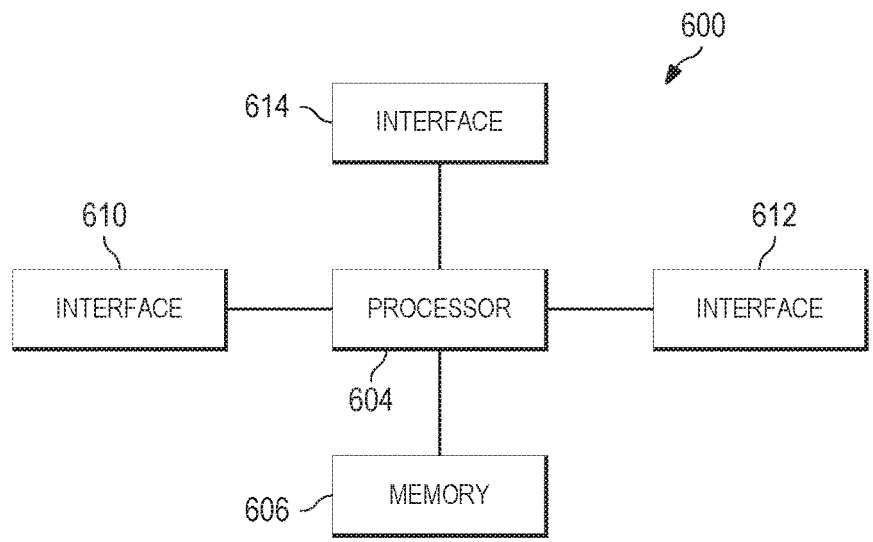
FIG. 6 is a block diagram illustrating a processing system for performing methods described herein, which may be installed in a host device, in accordance with embodiments of the present invention.

FIG. 6 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 6. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 6, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In an embodiment where the processing system 600 is included in a wireless device, the memory 606 stores programming for execution by the processor 604 and the programming includes instructions for receiving, via one or more of interfaces 610, 612, or 614, a first frame from an AP. The first frame includes a first information field, a second information field, and a data field. The programming also includes instructions for combining the first information field and the second information field to obtain a combined signal, and decoding the combined signal to obtain a decoded combined signal. The programming also includes instructions for determining whether the decoded combined signal includes an error. The programming also includes instructions, in response to determining that the decoded combined signal includes an error, for decoding the first information field and the second information field to obtain first information bits that include non-application data and second information bits that include non-application data. The programming also includes instructions for performing two cyclic redundancy checks that include a first cyclic redundancy check of the first information bits and a second cyclic redundancy check of the second information bits. The programming also includes instructions for decoding the data field to obtain payload bits that include application data.

In an embodiment where the processing system 600 is included in an AP, the memory 606 stores programming for execution by the processor 604 and the AP programming includes instructions for determining a transmit data field in accordance with a first transmission scheme and with transmit payload bits that include application data and a first check value. The AP programming also includes instructions for generating first transmit information bits that include non-application data and a second check value. The AP programming also includes instructions for determining a transmit preamble field and a duplicate transmit preamble field in accordance with a second transmission scheme and with the first transmit information bits. The AP programming also includes instructions for transmitting, via one or more of interfaces 610, 612, or 614, a transmit frame, which includes the transmit preamble field, the duplicate transmit preamble field, and the transmit data field. The AP programming also includes instructions for receiving, via one or more of interfaces 610, 612, or 614, a feedback message from a wireless device that received the transmit frame as a received frame. The feedback message indicates at least one bit error position determined during a bitwise comparison between first decoded information bits of the received frame and second decoded information bits of the received frame. The first decoded information bits correspond to the transmit preamble field, and the second decoded information bits correspond to the duplicated transmit preamble field.

Figure 7:
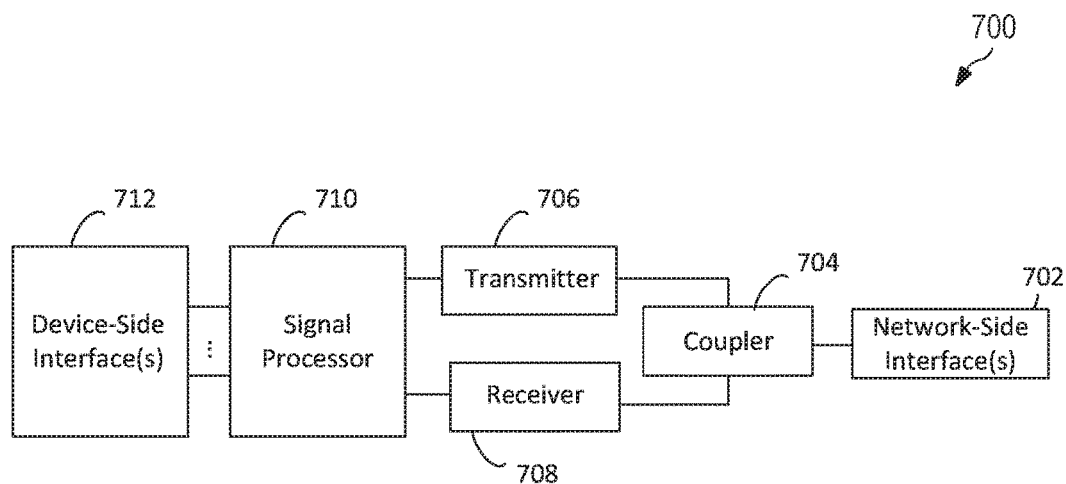
FIG. 7 illustrates a block diagram of a transceiver adapted to transmit and receive signaling over a telecommunications network, in accordance with embodiments of the present invention.

In some embodiments, one or more of the interfaces 610, 612, 614 connects the processing system 600 to a transceiver adapted to transmit and receive signaling over the telecommunications network. FIG. 7 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.). In an embodiment, the signal processor 710 includes the transmit processing stage 200 of FIG. 2A and the receive processing stage 250 of FIG. 2B.

Referring again to FIG. 7, the transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a decoding unit/module, a comparing unit/module, a modifying unit/module, a checking unit/module, an auto-correlating unit/module, a combining unit/module, a determining unit/module, and/or a generating unit/module. The respective units/modules may be hardware, software, or a combination thereof. For instance, one or more of the units/modules may be an integrated circuit, such as field programmable gate arrays (FPGAs) or application-specific integrated circuits (ASICs).

Figure 8A:
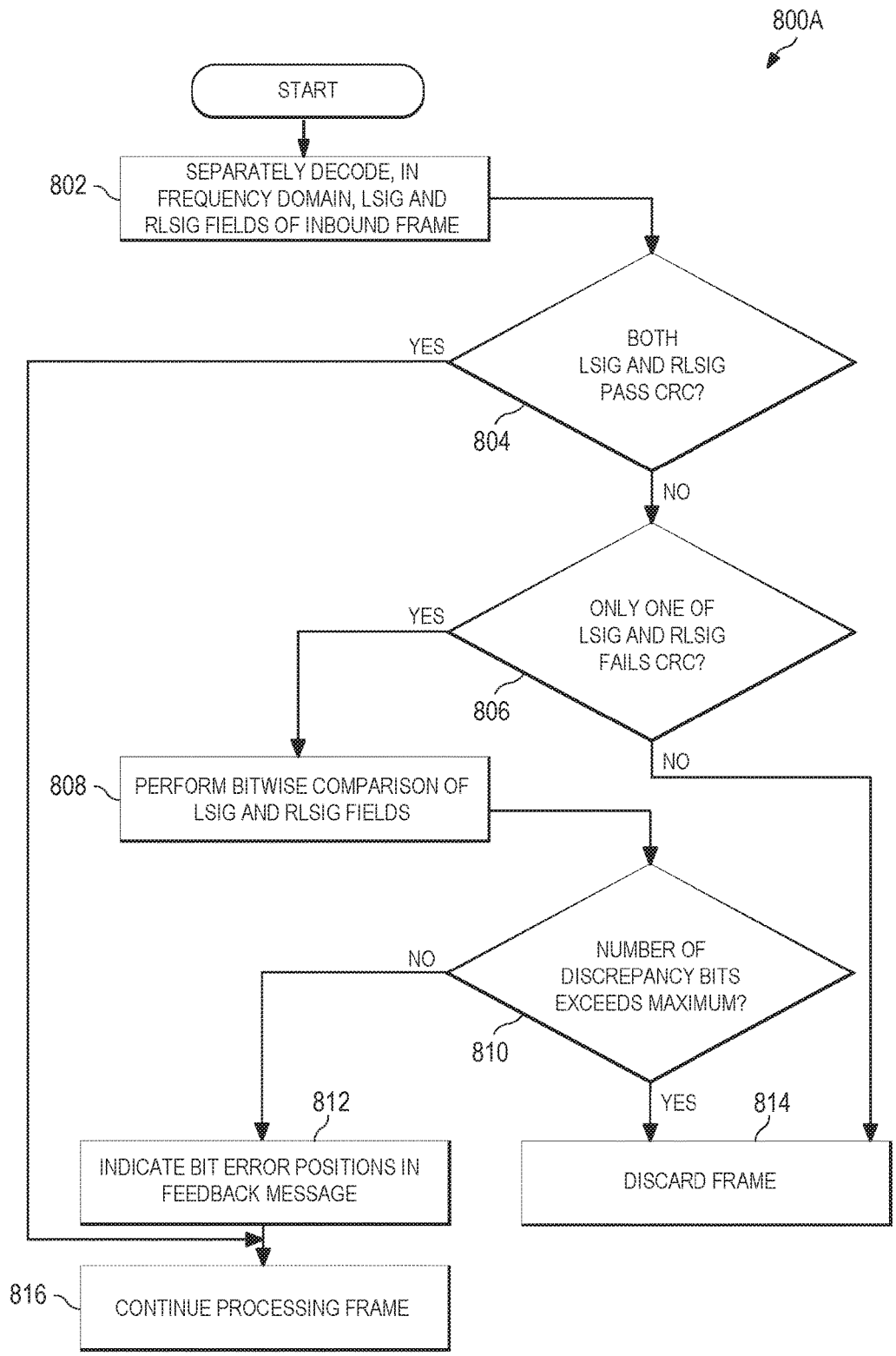
FIG. 8A is a flow diagram illustrating a first method for LSIG/RLSIG error detection/feedback, in accordance with embodiments of the present invention.

FIG. 8A is a flow diagram illustrating a first embodiment method 800A for individual LSIG/RLSIG error detection/feedback from a mobile device to an AP. At step 802, a mobile device begins processing of an inbound OFDM frame that was transmitted by an AP with coded LSIG and coded RLSIG fields included in the transmitted frame. The mobile device performs a decoding operation in the frequency domain in which it separately decodes each of the LSIG and RLSIG fields of the inbound frame. At step 804, the mobile device performs a CRC of each of the decoded LSIG and decoded RLSIG fields. If both the decoded LSIG field and the decoded RLSIG field pass the CRC, then the mobile device continues processing the frame at step 816, but otherwise flow continues at step 806. At step 806, if one of the decoded LSIG and decoded RLSIG fields fails the CRC and another one of these fields passes the CRC, flow continues at step 808, but otherwise flow continues at step 814 where the frame is discarded. At step 808, the mobile device performs a bitwise (i.e., bit-by-bit) comparison to determine one or more bit error positions of discrepancy bits between the decoded LSIG and decoded RLSIG fields, and the mobile device also determines the number of discrepancy bits between these fields. In an embodiment in which multiple channels (each containing multiple subcarriers) are combined for increasing communications robustness or data rate, the bitwise comparison of the decoded LSIG and decoded RLSIG fields is performed for each such channel.

Referring again to FIG. 8A, at step 810, the mobile device determines whether this number of discrepancy bits exceeds a pre-determined maximum number of bit errors (e.g., 4 bit errors). If the number of bit error positions exceeds this pre-determined maximum, flow continues at step 814 where the frame is discarded, but otherwise flow continues at step 812. At step 812, the mobile device indicates one or more bit error positions in a feedback message to the AP. In an embodiment in which multiple channels (each containing multiple subcarriers) are combined for increasing communications robustness or data rate, the bit error positions for each of these multiple channels are included in the feedback message to the AP.

Figure 8B:
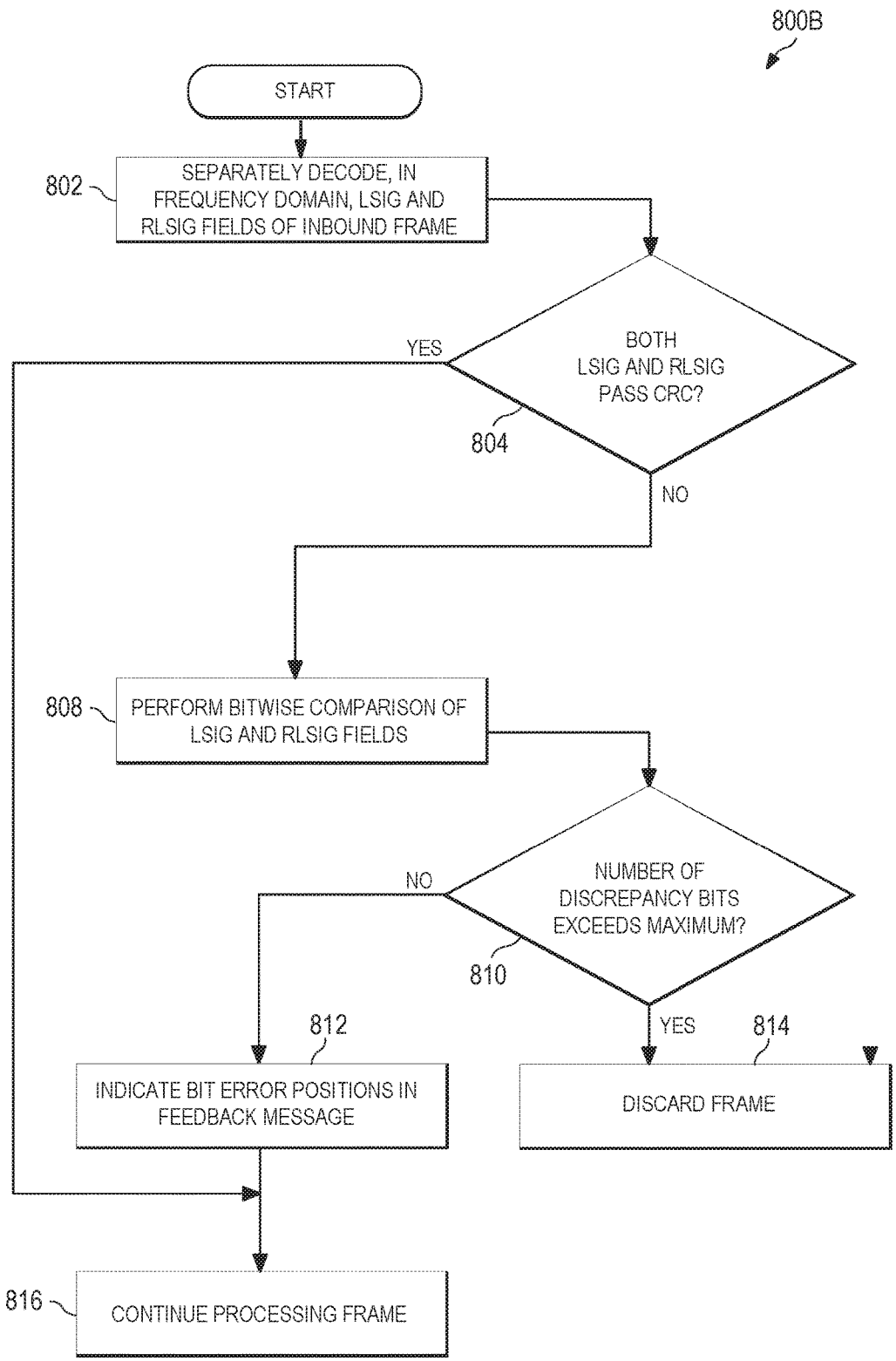
FIG. 8B is a flow diagram illustrating a second method for LSIG/RLSIG error detection/feedback, in accordance with embodiments of the present invention.

FIG. 8B is a flow diagram illustrating a second embodiment method 800B for individual LSIG/RLSIG error detection/feedback from a mobile device to an AP. FIG. 8B differs from FIG. 8A in that step 806 has been removed and the flow from step 804 has been re-routed. In FIG. 8B, if either of the decoded LSIG or decoded RLSIG fields fails the CRC, or if both of these fields fail the CRC, then flow continues at step 808 where the bitwise comparison is performed. If, however, both the decoded LSIG and decoded RLSIG pass the CRC, processing of the frame continues at step 816, as in FIG. 8A.

Figure 9A:
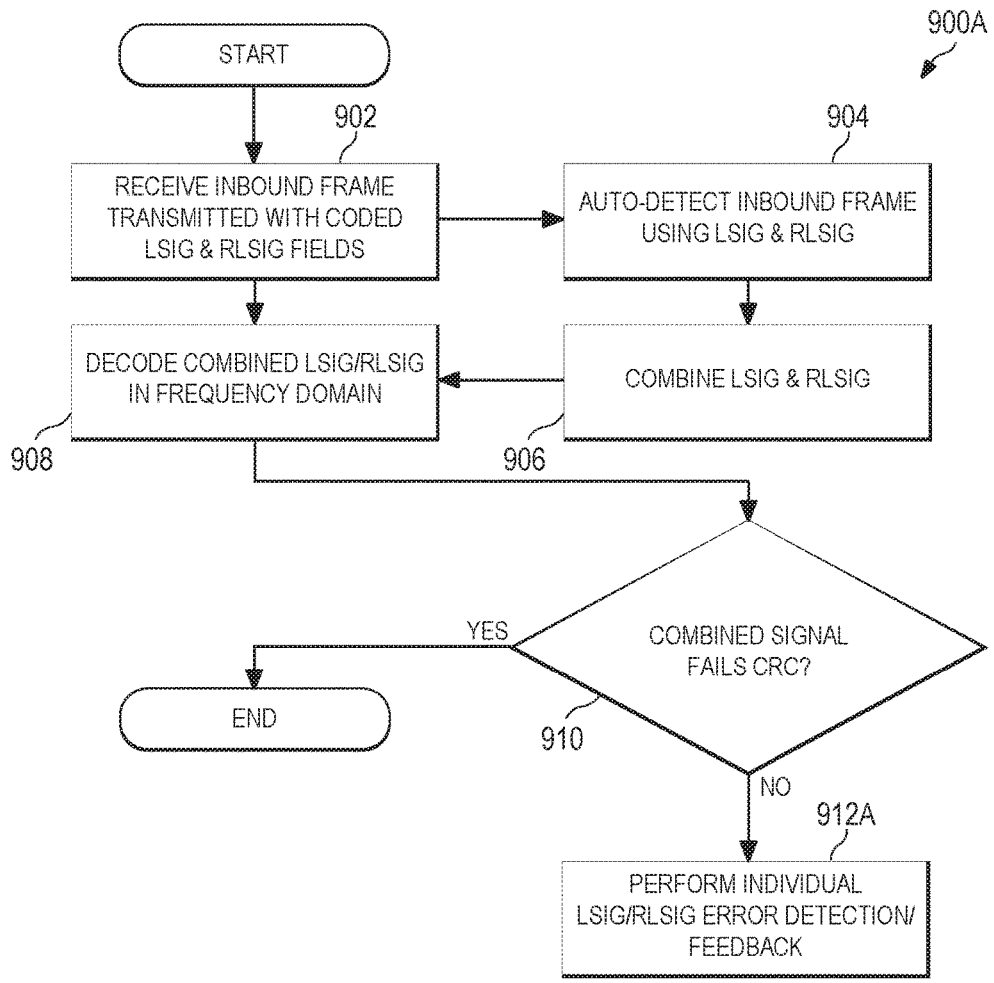
FIG. 9A is a flow diagram illustrating mobile device feedback processing that may be used in conjunction with the method of FIG. 8A, in accordance with embodiments of the present invention.
Figure 9B:
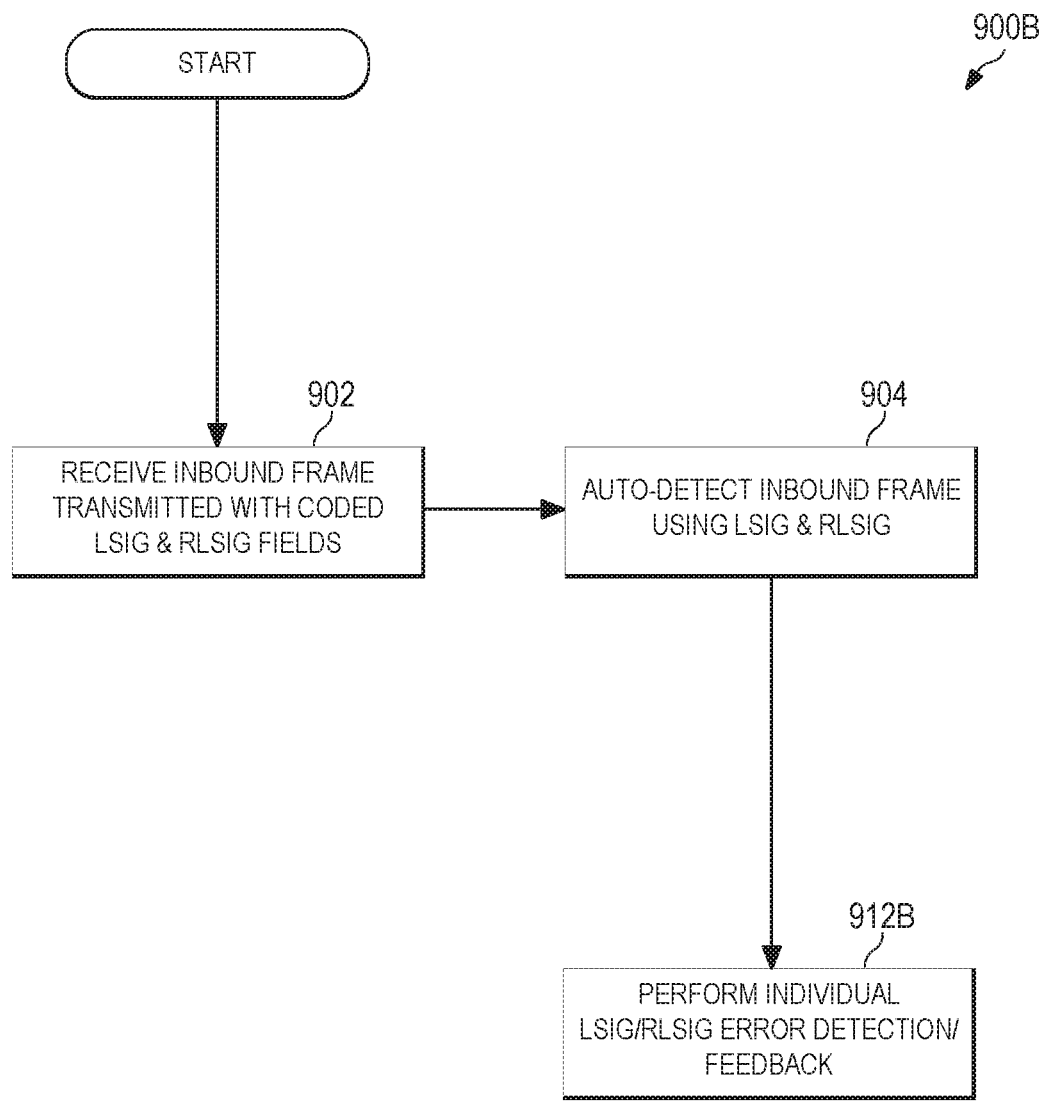
FIG. 9B is a flow diagram illustrating mobile device feedback processing that may be used in conjunction with the method of FIG. 8B, in accordance with embodiments of the present invention.

FIG. 9A and FIG. 9B are flow diagrams respectively illustrating embodiment mobile device feedback methods 900A and 900B that may be used for providing error detection/feedback for the frame 300A of FIG. 3A. Method 900A of FIG. 9A may be used in conjunction with the method 800A of FIG. 8A, and method 900B of FIG. 9B may be used in conjunction with the method 800B of FIG. 8B. In some embodiments, method 900A may be performed in mobile devices that decode a combined LSIG/RLSIG signal to provide a 1.5 dB gain in SNR. In other embodiments, method 900B may be performed in mobile devices that do not decode a combined LSIG/RLSIG signal.

Referring to FIG. 9A, at step 902, the mobile device receives an inbound frame 300A that was transmitted by an AP. At step 904, the mobile device auto-detects the inbound frame 300A by performing time-domain auto-correlation between the inbound coded LSIG field 308 and coded RLSIG field 310. At step 906, the mobile device combines the coded LSIG field 308 and coded RLSIG field 310 to generate a combined signal. At step 908, the mobile device decodes the combined signal in the frequency domain. At step 910, the mobile device performs a CRC on the decoded combined signal. In an embodiment, the CRC of each of the LSIG and RLSIG fields is a one-bit CRC, i.e., a parity check, and the CRC of the combined signal is therefore also a parity check.

Referring again to FIG. 9A, if the CRC of the combined signal fails at step 910, the method ends, but otherwise flow continues at step 912. At step 912A, the mobile device uses e.g., method 800A of FIG. 8A, to perform error detection/feedback for the individual LSIG and RLSIG.

Referring now to FIG. 9B, method 900B differs from method 900A of FIG. 9A in that steps 906, 908, 910, and 912A have been removed and have been replaced with step 912B. At step 912B, the mobile device uses e.g., method 800B of FIG. 8B, to perform error detection/feedback for the individual LSIG and RLSIG fields.

Figure 9C:
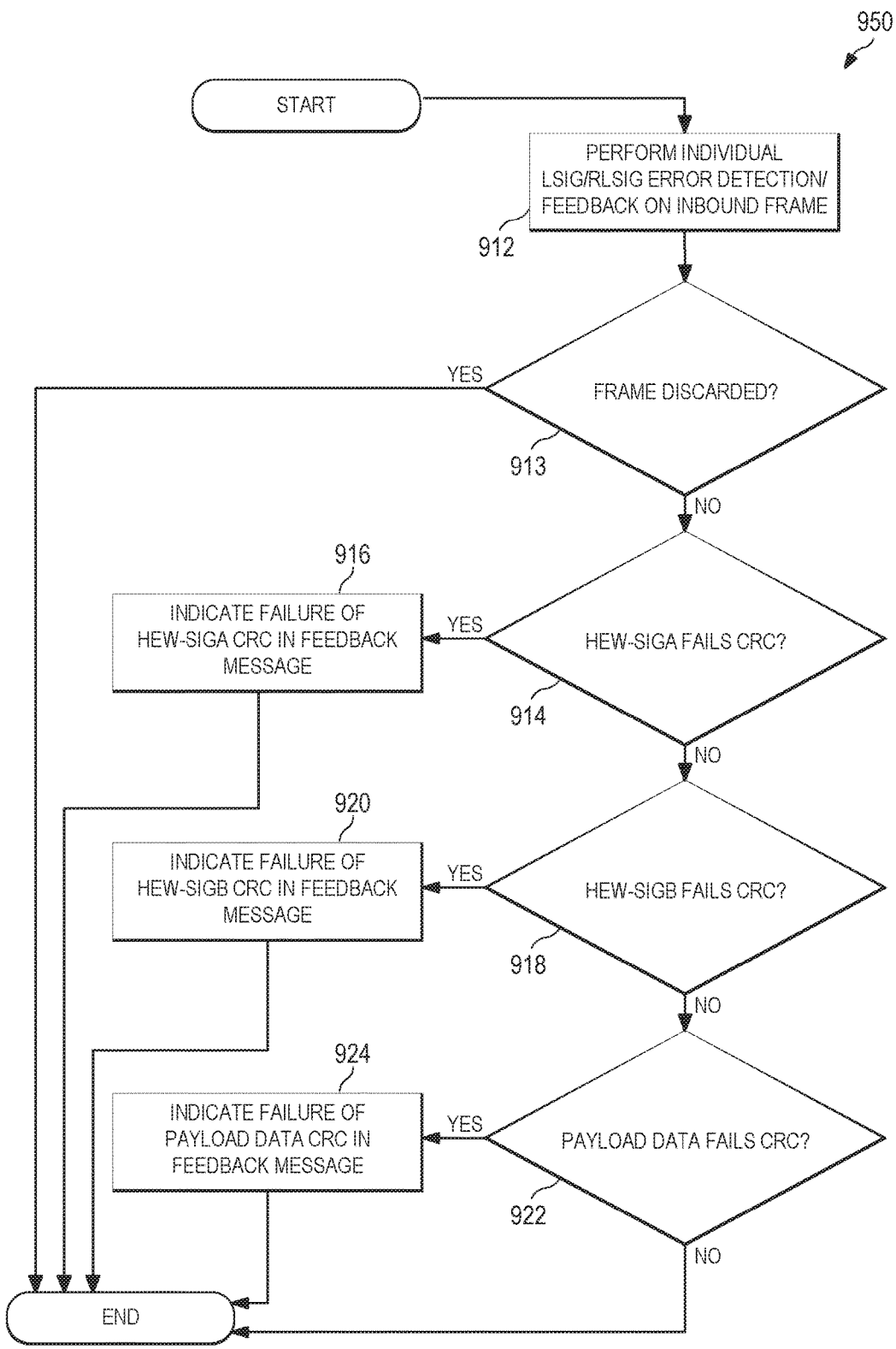
FIG. 9C is a flow diagram illustrating additional mobile device feedback processing that may be used in conjunction with the method of FIG. 8A or the method of FIG. 8B, in accordance with embodiments of the present invention.

FIG. 9C illustrates an embodiment method 950 for performing additional error detection/feedback for the frame 300A of FIG. 3A. At step 912, the mobile device uses e.g., method 800A of FIG. 8A or method 800B of FIG. 8B, to perform error detection/feedback for the individual LSIG and RLSIG fields. At step 913, the mobile device determines whether the inbound frame was discarded at step 912, in which case the method ends. Otherwise, flow continues at step 914. At step 914, a CRC is performed on the HEW-SIGA field 312, and if this CRC fails then flow continues at step 916, but in response to success of the HEW-SIGA CRC, flow continues at step 918. At step 916, the mobile device transmits a feedback message to the AP that indicates the failure of the HEW-SIGA CRC to the AP, and the method then ends.

At step 918, a CRC is performed on one of the HEW-SIGB fields 316 and 318, and if this CRC fails then flow continues at step 920, but otherwise flow continues at step 922. At step 920, the mobile device transmits a feedback message to the AP that indicates the failure of the HEW-SIGB CRC to the AP, and the method then ends.

At step 922, a CRC is performed on one or more payload data fields of the payload data portion 303 of the frame, and if this CRC fails then flow continues at step 924, but otherwise the method ends at step 926. At step 924, the mobile device transmits a feedback message to the AP that indicates the failure of the payload data CRC to the AP, and the method then ends.

Figure 10:
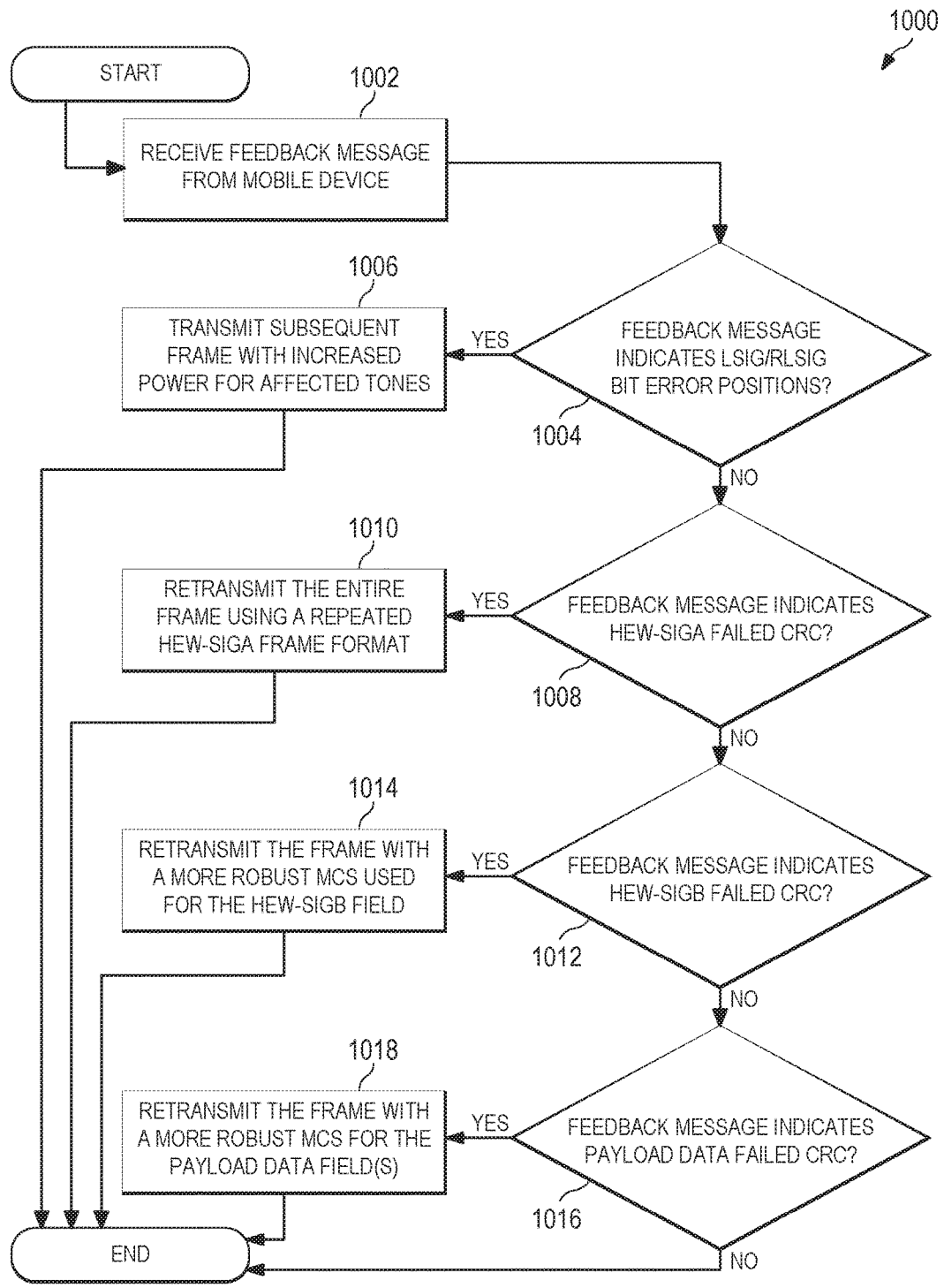
FIG. 10 is a flow diagram illustrating base station feedback response processing, in accordance with embodiments of the present invention.

FIG. 10 is a flow diagram illustrating embodiment a base station feedback response method 1000 that may be used in conjunction with method 800A or 800B of FIG. 8A-8B and method 900A or 900B of FIG. 9A-9B. At step 1002, the AP receives a feedback message from a mobile device. At step 1004, the AP determines whether the feedback message indicates one or more bit error positions that were detected by the mobile device during a comparison of the LSIG and RLSIG fields of a frame received from the AP.

If one or more LSIG/RLSIG bit error positions were detected, flow continues at step 1006, but otherwise flow continues at step 1008. At step 1006, the AP transmits a subsequent frame with increased transmit power for the tones affected by the bit error bit position(s), and the method then ends. In an embodiment, the AP boosts the transmit power at step 1006 while maintaining the same MCS that was used for the received frame that is the subject of the feedback message. In an embodiment, the AP applies the discovered bit error position(s) of the LSIG/RLSIG comparison towards the payload data. For example, given the same interleaving/mapping and FEC, when the LSIR and RLSIG have been transformed using a 64-point FFT and the payload data has been transformed using a 256-point FFT, the adjacent eight tones will be in error including the configured error bit.

In an Orthogonal Frequency Division Multiple Access (OFDMA) embodiment, an AP is capable of taking coordinated action based on bit error feedback received from multiple mobile devices. In an embodiment, the AP is capable of using bit error feedback from one or more mobile devices to determine the most error-free tone groups for its next transmission to a particular mobile device. In an embodiment, the AP may also use the feedback from one or more mobile devices to modify an existing resource allocation for the particular mobile device such that its allocated resources are in a frequency range where the least number of errors have been detected.

Referring again to FIG. 10, at step 1008, the AP determines whether the feedback message indicates a failure of an HEW-SIGA CRC for a frame received from the AP. If an HEW-SIGA CRC failure is indicated, flow continues at step 1010, but otherwise flow continues at step 1012. At step 1010, the AP retransmits the entire frame using a repeated HEW-SIGA frame format, and the method then ends. At step 1012, the AP determines whether the feedback message indicates a failure of an HEW-SIGB CRC for a frame received from the AP.

If an HEW-SIGB CRC failure is indicated, flow continues at step 1014, but otherwise flow continues at step 1016. At step 1014, the AP retransmits the frame with a more robust MCS used for the HEW-SIGB field, and the method then ends. At step 1016, the AP determines whether the feedback message indicates a failure of one or more payload data fields for a frame received from the AP.

If a payload data failure is indicated, flow continues at step 1018, but otherwise the method ends. At step 1018, the AP retransmits the frame with a more robust MCS used for the payload data fields, and the method then ends. In some embodiments, the AP minimizes the number of re-transmissions of the frame by using a uniform MCS for all fields of the frame, although this MCS may change for subsequent re-transmissions of the frame.

Illustrative embodiments of the claimed invention have the advantage of improving packet retransmission procedures with minimal additional overhead. An embodiment OFDM system may use, for example, a bitwise comparison of duplicated preamble fields to provide communications feedback that indicates frequency fading so that transmit power may be boosted or resource allocation modified for subsequent transmissions. Embodiment systems may further benefit from per-tone error detection in the preamble to prevent an expansion of bit errors over the affected frequencies in transmitted payload data.

The following additional example embodiments of the present invention are also provided. In accordance with a first example embodiment of the present invention, a method is provided for error feedback that includes receiving, by a wireless device, a first preamble field and a repeated preamble field of a first frame. The method also includes decoding, in a frequency domain, the first preamble field and the repeated preamble field to obtain a first set of bits and a second set of bits. The method also includes performing a bitwise comparison of the first set of bits and the second set of bits to determine at least one bit error position.

Also, the foregoing first example embodiment may be implemented to include one or more of the following additional features. The method may also be implemented such that it further includes transmitting, by the wireless device, a feedback message to an Access Point (AP). The feedback message may include the at least one bit error position. The first frame may be received by the wireless device from the AP.

The method may also be implemented such that it further includes determining that a number of bit error positions of the at least one bit error position is not greater than a pre-determined maximum. In some such implementations, transmitting the feedback message by the wireless device is in response to determining that the number of bit error positions of the at least one bit error position is not greater than the pre-determined maximum.

The method may also be implemented such that it further includes receiving, by the wireless device, a second frame that was transmitted by the AP in accordance with an increased transmit power of at least one tone relative to the first frame. The at least one tone may correspond to the at least one bit error position.

The method may also be implemented such that it further includes performing, by the wireless device, two parity checks. The two parity checks include a parity check of the first set of bits and a parity check of the second set of bits. In some such implementations, performing the bitwise comparison of the first set of bits and the second set of bits is in response to a failure of at least one of the two parity checks. The first preamble field may include a Legacy Signal (LSIG) field and the repeated preamble field may include a Repeated Legacy Signal (RLSIG) field.

The method may also be implemented such that it further includes performing, by the wireless device, auto-correlation of the LSIG field with the RLSIG field and combining the LSIG field with the RLSIG field to obtain a combined signal. In some such implementations, the method also includes decoding the combined signal in the frequency domain to obtain a third set of bits and performing a parity check of the third set of bits. In some such implementations, decoding the first preamble field and the repeated preamble field is in response to passing the parity check of the third set of bits, and performing the bitwise comparison of the first set of bits and the second set of bits is further in response to a success of one of the two parity checks.

The method may also be implemented such that it further includes modifying, by the AP, a resource allocation in accordance with the at least one bit error position. The method may also be implemented such that combining the LSIG field with the RLSIG field includes combining using a log likelihood ratio.

In accordance with a second example embodiment of the present invention, a method is provided for error feedback. The method includes receiving, by a wireless device, a first frame that includes a first preamble field, a second preamble field, and a data field. The method also includes combining the first preamble field and the second preamble field to obtain a combined signal and decoding the combined signal to obtain a decoded combined signal. The method also includes determining that the decoded combined signal includes a bit error. The method also includes, in response to determining that the decoded combined signal includes a bit error, decoding the first preamble field and the second preamble field to obtain first information bits that include non-application data and second information bits that include non-application data. The method also includes performing two cyclic redundancy checks, which include a first cyclic redundancy check of the first information bits and a second cyclic redundancy check of the second information bits. The method also includes decoding the data field to obtain payload bits that include application data.

Also, the foregoing second example embodiment may be implemented to include one or more of the following additional features. The method may also be implemented such that it further includes receiving, by an AP, the application data from an application layer. In some such implementations, the method also includes determining a transmit data field in accordance with a first transmission scheme and with transmit payload bits that include the application data. In some such implementations, the method also includes generating, by the AP, first transmit information bits that include the non-application data, and determining a transmit preamble field and a duplicate transmit preamble field in accordance with a second transmission scheme and with the first transmit information bits. In some such implementations, the method also includes transmitting, by the AP, a transmit frame that includes the transmit preamble field, the duplicate transmit preamble field and the transmit data field. In some such implementations, receiving the first frame by the wireless device includes receiving the transmit frame from the AP.

The method may also be implemented such that it further includes, in response to failing one of the two cyclic redundancy checks and passing one of the two cyclic redundancy checks, performing a bitwise comparison of the first information bits and the second information bits to determine at least one bit error position. The two cyclic redundancy checks may include two parity checks. In some such implementations, decoding the first preamble field and the second preamble field includes decoding in a frequency domain, and decoding the data field includes decoding in the frequency domain.

The method may also be implemented such that it further includes receiving, by the wireless device, a second frame that was transmitted by the AP in accordance with a modified transmit characteristic of at least one tone relative to the first frame. A bit expansion of the first transmission scheme may be greater than a bit expansion of the second transmission scheme. Each of the at least one bit error position corresponds to multiple payload bit positions, and the at least one tone corresponds to the at least one bit error position and to multiple payload bit positions.

The method may also be implemented where the modified transmit characteristic includes an increased transmit power.

The first transmission scheme includes a first Modulation and Coding Scheme (MCS), and the second transmission scheme includes a second MCS. The transmit preamble field includes an LSIG field, and the duplicate transmit preamble field includes an RLSIG field.

The method may also be implemented such that it further includes determining that a number of bit error positions of the at least one bit error position is not greater than a pre-determined maximum. In some such implementations, in response to the determining that the number of bit error positions of the at least one bit error position is not greater than the pre-determined maximum, the method also includes transmitting, by the wireless device, a feedback message to the AP. The feedback message includes the at least one bit error position.

The method may also be implemented such that it further includes decoding at least one of a third preamble field or a fourth preamble field to obtain third information bits, and performing a third cyclic redundancy check of the third information bits. In some such implementations, the method also includes, in response to a failure of the third cyclic redundancy check, transmitting, by the wireless device, a feedback message to the AP. The first frame may further include the third preamble field and the fourth preamble field.

The method may also be implemented such that it further includes performing a fourth cyclic redundancy check of the payload bits, and in response to a failure of the fourth cyclic redundancy check, transmitting, by the wireless device, a feedback message to the AP. The feedback message may indicate the failure of the fourth cyclic redundancy check.

In accordance with a third example embodiment of the present invention, a wireless device is provided. The wireless device includes a processor, and a non-transitory computer readable storage medium coupled to the processor and storing programming for execution by the processor. The programming including instructions for receiving a first frame from an AP. The first frame includes a first information field, a second information field, and a data field. The programming also includes instructions for combining the first information field and the second information field to obtain a combined signal, and decoding the combined signal to obtain a decoded combined signal. The programming also includes instructions for determining whether the decoded combined signal includes an error. The programming also includes instructions, in response to determining that the decoded combined signal includes an error, for decoding the first information field and the second information field to obtain first information bits that include non-application data and second information bits that include non-application data. The programming also includes instructions for performing two cyclic redundancy checks that include a first cyclic redundancy check of the first information bits and a second cyclic redundancy check of the second information bits. The programming also includes instructions for decoding the data field to obtain payload bits that include application data.

Also, the foregoing third example embodiment may be implemented to include one or more of the following additional features. The wireless device may be implemented such that the programming further includes instructions for, in response to a failure of one of the two cyclic redundancy checks and a success of one of the two cyclic redundancy checks, performing a bitwise comparison of the first information bits and the second information bits to determine at least one bit error position. The two cyclic redundancy checks may include two parity checks. The instructions for decoding the first information field and the second information field may include instructions for decoding in a frequency domain. The instructions for decoding the data field may also include instructions for decoding in the frequency domain.

The wireless device may also be implemented such that the programming further includes instructions for receiving a second frame that was transmitted by the AP in accordance with increased transmit power of at least one tone relative to the first frame. The at least one tone may correspond to the at least one bit error position.

The wireless device may also be implemented such that the programming further includes instructions for determining that a number of bit error positions of the at least one bit error position is not greater than a pre-determined maximum. In some such implementations, in response to determining that the number of bit error positions of the at least one bit error position is not greater than the pre-determined maximum, the method also includes transmitting a feedback message to the AP. The feedback message may include the at least one bit error position.

The wireless device may also be implemented such that the first information field includes an LSIG field of a preamble of the first frame. The second information field may include an RLSIG field of the preamble of the first frame.

The wireless device may also be implemented such that the first frame further includes a third preamble field and a fourth preamble field. The programming may further include instructions for decoding at least one of the third preamble field or the fourth preamble field to obtain a third set of information bits, performing a third cyclic redundancy check of the third set of information bits, and in response to a failure of the third cyclic redundancy check, transmitting a feedback message to the AP.

The wireless device may also be implemented such that the programming further includes instructions for performing a fourth cyclic redundancy check of the payload bits, and in response to a failure of the fourth cyclic redundancy check, transmitting a feedback message to the AP. The feedback message may indicate the failure of the fourth cyclic redundancy check.

In accordance with a fourth example embodiment of the present invention, a system for telecommunications is provided. The system includes an AP, which includes a processor, and a non-transitory computer readable storage medium coupled to the processor and storing AP programming for execution by the processor. The AP programming includes instructions for determining a transmit data field in accordance with a first transmission scheme and with transmit payload bits that include application data and a first check value. The AP programming also includes instructions for generating first transmit information bits that include non-application data and a second check value. The AP programming also includes instructions for determining a transmit preamble field and a duplicate transmit preamble field in accordance with a second transmission scheme and with the first transmit information bits. The AP programming also includes instructions for transmitting a transmit frame, which includes the transmit preamble field, the duplicate transmit preamble field, and the transmit data field. The AP programming also includes instructions for receiving a feedback message from a wireless device that received the transmit frame as a received frame. The feedback message indicates at least one bit error position determined during a bitwise comparison between first decoded information bits of the received frame and second decoded information bits of the received frame. The first decoded information bits correspond to the transmit preamble field, and the second decoded information bits correspond to the duplicated transmit preamble field.

Also, the foregoing fourth example embodiment may be implemented to include one or more of the following additional features. The system may also be implemented such that the AP programming further includes instructions for modifying a transmit characteristic corresponding to the at least one bit error position and to multiple payload bit positions, and transmitting, in accordance with the modified transmit characteristic, a second transmit frame. A bit expansion of the first transmission scheme may be greater than a bit expansion of the second transmission scheme such that each of the at least one bit error position corresponds to multiple payload bit positions.

The system may also be implemented such that the modified transmit characteristic includes an increased transmit power. The first transmission scheme may include a first MCS and the second transmission scheme may include a second MCS. The transmit preamble field may include an LSIG field, and the duplicate transmit preamble field may include an RLSIG field.

The system may also be implemented such that it further includes the wireless device, which includes a second processor. The wireless device may also include a second non-transitory computer readable storage medium coupled to the second processor and storing wireless device programming for execution by the second processor. The wireless device programming may include instructions for decoding, in a frequency domain, a first preamble field of the received frame and a second preamble field of the received frame to obtain the first decoded information bits and the second decoded information bits. The wireless device programming may also include instructions for determining that a number of bit error positions of the at least one bit error position is not greater than a pre-determined maximum. The wireless device programming may also include instructions for transmitting the feedback message in response to determining that the number of bit error positions of the at least one bit error position is not greater than the pre-determined maximum.

The system may also be implemented such that the wireless device programming further includes instructions for performing two parity checks. The two parity checks may include an LSIG parity check of the first decoded information bits and an RLSIG parity check of the second decoded information bits. The wireless device programming may also include instructions for performing the bitwise comparison in response to a failure of one of the two parity checks and a success of one of the two parity checks.

The system may also be implemented such that the wireless device programming further includes instructions for performing auto-correlation of the LSIG field with the RLSIG field and combining the LSIG field with the RLSIG field to obtain a combined signal. The wireless device programming may also include instructions for decoding the combined signal in a frequency domain to obtain a third set of bits and performing a parity check of the third set of bits. In some such embodiments, the wireless device programming instructions for decoding the first preamble field and the second preamble field are executed in response to passing the parity check of the third set of bits.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for error feedback comprising:
   wirelessly receiving, by a wireless device, a first preamble field and a repeated preamble field of a first frame;
   decoding, by the wireless device in a frequency domain, the first preamble field and the repeated preamble field to obtain a first set of bits and a second set of bits;
   performing, by the wireless device, a bitwise comparison of the first set of bits and the second set of bits to determine at least one bit error position; and
   wirelessly transmitting, by the wireless device, a feedback message indicating the at least one bit error position.

2. The method of claim 1, wherein the transmitting comprises:
   transmitting, by the wireless device, the feedback message to an Access Point (AP), wherein
      the feedback message comprises the at least one bit error position, and
      the first frame is received by the wireless device from the AP.

3. The method of claim 2, further comprising:
   determining that a number of bit error positions of the at least one bit error position is not greater than a pre-determined maximum, wherein
      the transmitting, by the wireless device, the feedback message is in response to the determining that the number of bit error positions of the at least one bit error position is not greater than the pre-determined maximum.

4. The method of claim 2, further comprising:
   receiving, by the wireless device, a second frame that was transmitted by the AP in accordance with an increased transmit power of at least one tone relative to the first frame, wherein the at least one tone corresponds to the at least one bit error position.

5. The method of claim 2, further comprising:
   modifying, by the AP, a resource allocation in accordance with the at least one bit error position.

6. The method of claim 1, further comprising:
   performing, by the wireless device, two parity checks, the two parity checks comprising a parity check of the first set of bits and a parity check of the second set of bits, wherein:
      the performing the bitwise comparison of the first set of bits and the second set of bits is in response to a failure of at least one of the two parity checks; and
      the first preamble field comprises a legacy signal (LSIG) field and the repeated preamble field comprises a repeated legacy signal (RLSIG) field.

7. The method of claim 6, further comprising:
   performing, by the wireless device, auto-correlation of the LSIG field with the RLSIG field;
   combining the LSIG field with the RLSIG field to obtain a combined signal;
   decoding the combined signal in the frequency domain to obtain a third set of bits; and
   performing a parity check of the third set of bits, wherein:
      the decoding the first preamble field and the repeated preamble field is in response to passing the parity check of the third set of bits; and
      the performing the bitwise comparison of the first set of bits and the second set of bits is further in response to a success of one of the two parity checks.

8. The method of claim 7, wherein the combining the LSIG field with the RLSIG field comprises combining using a log likelihood ratio.

9. A method for error feedback, comprising:
receiving, by a wireless device, a first frame comprising a first preamble field, a second preamble field, and a data field;
combining the first preamble field and the second preamble field to obtain a combined signal;
decoding the combined signal to obtain a decoded combined signal;
determining that the decoded combined signal includes a bit error;
in response to determining that the decoded combined signal includes a bit error, decoding the first preamble field and the second preamble field to obtain first information bits comprising non-application data and second information bits comprising non-application data;
performing two cyclic redundancy checks comprising a first cyclic redundancy check of the first information bits and a second cyclic redundancy check of the second information bits; and
decoding the data field to obtain payload bits comprising application data.

10. The method of claim 9, further comprising:
receiving, by an Access Point (AP), the application data from an application layer;
determining a transmit data field in accordance with a first transmission scheme and with transmit payload bits comprising the application data;
generating, by the AP, first transmit information bits comprising the non-application data;
determining a transmit preamble field and a duplicate transmit preamble field in accordance with a second transmission scheme and with the first transmit information bits; and
transmitting, by the AP, a transmit frame comprising the transmit preamble field, the duplicate transmit preamble field and the transmit data field, wherein the receiving, by the wireless device, the first frame comprises receiving the transmit frame from the AP.

11. The method of claim 10, further comprising:
in response to failing one of the two cyclic redundancy checks and passing one of the two cyclic redundancy checks, performing a bitwise comparison of the first information bits and the second information bits to determine at least one bit error position, wherein:
the two cyclic redundancy checks comprise two parity checks;
the decoding the first preamble field and the second preamble field comprises decoding in a frequency domain; and
the decoding the data field comprises decoding in the frequency domain.

12. The method of claim 11, further comprising:
receiving, by the wireless device, a second frame that was transmitted by the AP in accordance with a modified transmit characteristic of at least one tone relative to the first frame, wherein:
a bit expansion of the first transmission scheme is greater than a bit expansion of the second transmission scheme such that each of the at least one bit error position corresponds to multiple payload bit positions; and
the at least one tone corresponds to the at least one bit error position and to multiple payload bit positions.

13. The method of claim 12, wherein:
the modified transmit characteristic comprises an increased transmit power;
the first transmission scheme comprises a first modulation and coding scheme (MCS);
the second transmission scheme comprises a second MCS;
the transmit preamble field comprises a legacy signal (LSIG) field; and
the duplicate transmit preamble field comprises a repeated legacy signal (RLSIG) field.

14. The method of claim 11, further comprising:
determining that a number of bit error positions of the at least one bit error position is not greater than a pre-determined maximum; and
in response to the determining that the number of bit error positions of the at least one bit error position is not greater than the pre-determined maximum, transmitting, by the wireless device, a feedback message to the AP, wherein the feedback message comprises the at least one bit error position.

15. The method of claim 10, further comprising:
decoding at least one of a third preamble field or a fourth preamble field to obtain third information bits;
performing a third cyclic redundancy check of the third information bits; and
in response to a failure of the third cyclic redundancy check, transmitting, by the wireless device, a feedback message to the AP, wherein
the first frame further comprises the third preamble field and the fourth preamble field.

16. The method of claim 10, further comprising:
performing a fourth cyclic redundancy check of the payload bits; and
in response to a failure of the fourth cyclic redundancy check, transmitting, by the wireless device, a feedback message to the AP, wherein the feedback message indicates the failure of the fourth cyclic redundancy check.

17. A wireless device, comprising:
a processor; and
a non-transitory computer readable storage medium coupled to the processor and storing programming for execution by the processor, the programming including instructions for:
receiving a first frame from an Access Point (AP), the first frame comprising a first information field, a second information field, and a data field;
combining the first information field and the second information field to obtain a combined signal;
decoding the combined signal to obtain a decoded combined signal;
determining whether the decoded combined signal includes an error;
in response to determining that the decoded combined signal includes an error, decoding the first information field and the second information field to obtain first information bits comprising non-application data and second information bits comprising non-application data;
performing two cyclic redundancy checks comprising a first cyclic redundancy check of the first information bits and a second cyclic redundancy check of the second information bits; and
decoding the data field to obtain payload bits comprising application data.

18. The wireless device of claim 17, wherein:
the programming further comprises instructions for, in response to a failure of one of the two cyclic redundancy checks and a success of one of the two cyclic redundancy checks, performing a bitwise comparison of the first information bits and the second information bits to determine at least one bit error position;
the two cyclic redundancy checks comprise two parity checks;
the instructions for decoding the first information field and the second information field comprises instructions for decoding in a frequency domain; and
the instructions for decoding the data field comprise instructions for decoding in the frequency domain.

19. The wireless device of claim 18, wherein:
the programming further comprises instructions for receiving a second frame that was transmitted by the AP in accordance with increased transmit power of at least one tone relative to the first frame; and
the at least one tone corresponds to the at least one bit error position.

20. The wireless device of claim 18, wherein:
the programming further comprises instructions for:
 determining that a number of bit error positions of the at least one bit error position is not greater than a pre-determined maximum; and
 in response to the determining that the number of bit error positions of the at least one bit error position is not greater than the pre-determined maximum, transmitting a feedback message to the AP; and
the feedback message comprises the at least one bit error position.

21. The wireless device of claim 18, wherein:
the first information field comprises a legacy signal (LSIG) field of a preamble of the first frame; and
the second information field comprises a repeated legacy signal (RLSIG) field of the preamble of the first frame.

22. The wireless device of claim 21, wherein:
the first frame further comprises a third preamble field and a fourth preamble field; and
the programming further comprises instructions for:
 decoding at least one of the third preamble field or the fourth preamble field to obtain a third set of information bits;
 performing a third cyclic redundancy check of the third set of information bits; and
 in response to a failure of the third cyclic redundancy check, transmitting a feedback message to the AP.

23. The wireless device of claim 17, wherein the programming further comprises instructions for:
performing a fourth cyclic redundancy check of the payload bits; and
in response to a failure of the fourth cyclic redundancy check, transmitting a feedback message to the AP, wherein the feedback message indicates the failure of the fourth cyclic redundancy check.

24. A system for telecommunications, comprising:
An Access Point (AP) comprising:
 a processor; and
 a non-transitory computer readable storage medium coupled to the processor and storing AP programming for execution by the processor, the AP programming including instructions for:
  determining a transmit data field in accordance with a first transmission scheme and with transmit payload bits comprising application data and a first check value;
  generating first transmit information bits comprising non-application data and a second check value;
  determining a transmit preamble field and a duplicate transmit preamble field in accordance with a second transmission scheme and with the first transmit information bits;
  transmitting a transmit frame comprising the transmit preamble field, the duplicate transmit preamble field and the transmit data field; and
  receiving a feedback message from a wireless device that received the transmit frame as a received frame, the feedback message indicating at least one bit error position determined during a bitwise comparison between first decoded information bits of the received frame and second decoded information bits of the received frame, the first decoded information bits corresponding to the transmit preamble field, and the second decoded information bits corresponding to the duplicated transmit preamble field.

25. The system of claim 24, wherein:
the AP programming further comprises instructions for:
 modifying a transmit characteristic corresponding to the at least one bit error position and to multiple payload bit positions; and
 transmitting, in accordance with the modified transmit characteristic, a second transmit frame; and
a bit expansion of the first transmission scheme is greater than a bit expansion of the second transmission scheme such that each of the at least one bit error position corresponds to multiple payload bit positions.

26. The system of claim 25, wherein:
the modified transmit characteristic comprises an increased transmit power;
the first transmission scheme comprises a first modulation and coding scheme (MCS);
the second transmission scheme comprises a second MCS;
the transmit preamble field comprises a legacy signal (LSIG) field; and
the duplicate transmit preamble field comprises a repeated legacy signal (RLSIG) field.

27. The system of claim 26, further comprising:
the wireless device, comprising:
 a second processor; and
 a second non-transitory computer readable storage medium coupled to the second processor and storing wireless device programming for execution by the second processor, the wireless device programming including instructions for:
  decoding, in a frequency domain, a first preamble field of the received frame and a second preamble field of the received frame to obtain the first decoded information bits and the second decoded information bits;
  determining that a number of bit error positions of the at least one bit error position is not greater than a pre-determined maximum; and
  in response to the determining that the number of bit error positions of the at least one bit error position is not greater than the pre-determined maximum, transmitting the feedback message.

28. The system of claim 27, wherein the wireless device programming further comprises instructions for:
performing two parity checks, the two parity checks comprising an LSIG parity check of the first decoded information bits and an RLSIG parity check of the second decoded information bits; and performing the bitwise comparison in response to a failure of one of the two parity checks and a success of one of the two parity checks.

29. The system of claim 28, wherein:

the wireless device programming further comprises instructions for:
- performing auto-correlation of the LSIG field with the RLSIG field;
- combining the LSIG field with the RLSIG field to obtain a combined signal;
- decoding the combined signal in a frequency domain to obtain a third set of bits; and
- performing a parity check of the third set of bits; and the wireless device programming instructions for the decoding the first preamble field and the second preamble field are executed in response to passing the parity check of the third set of bits.

* * * * *